Jan. 5, 1954

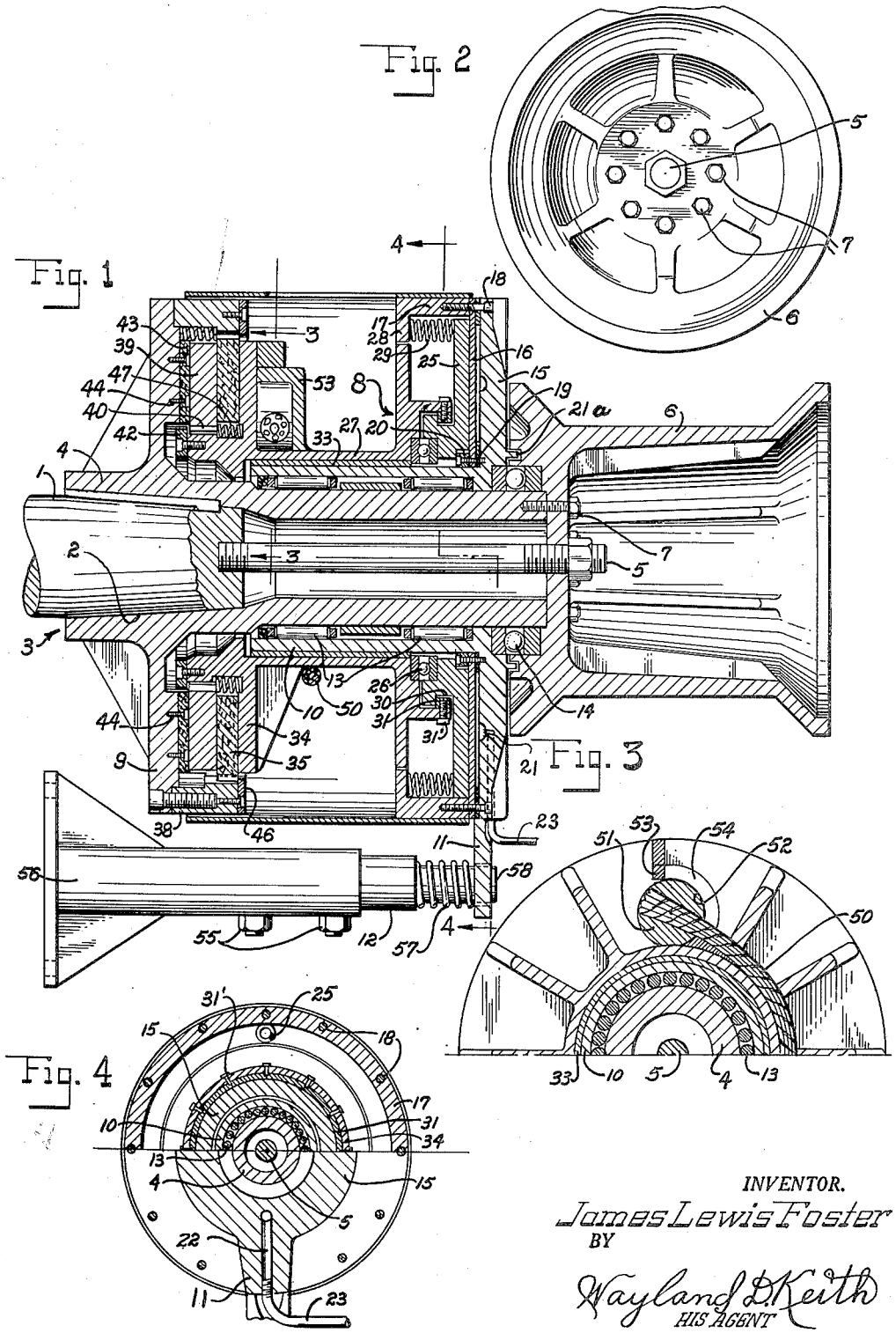

J. L. FOSTER
WINDING DEVICE 2,665,113

Filed Nov. 19, 1948

INVENTOR.
*James Lewis Foster*
BY
*Wayland D. Keith*
HIS AGENT

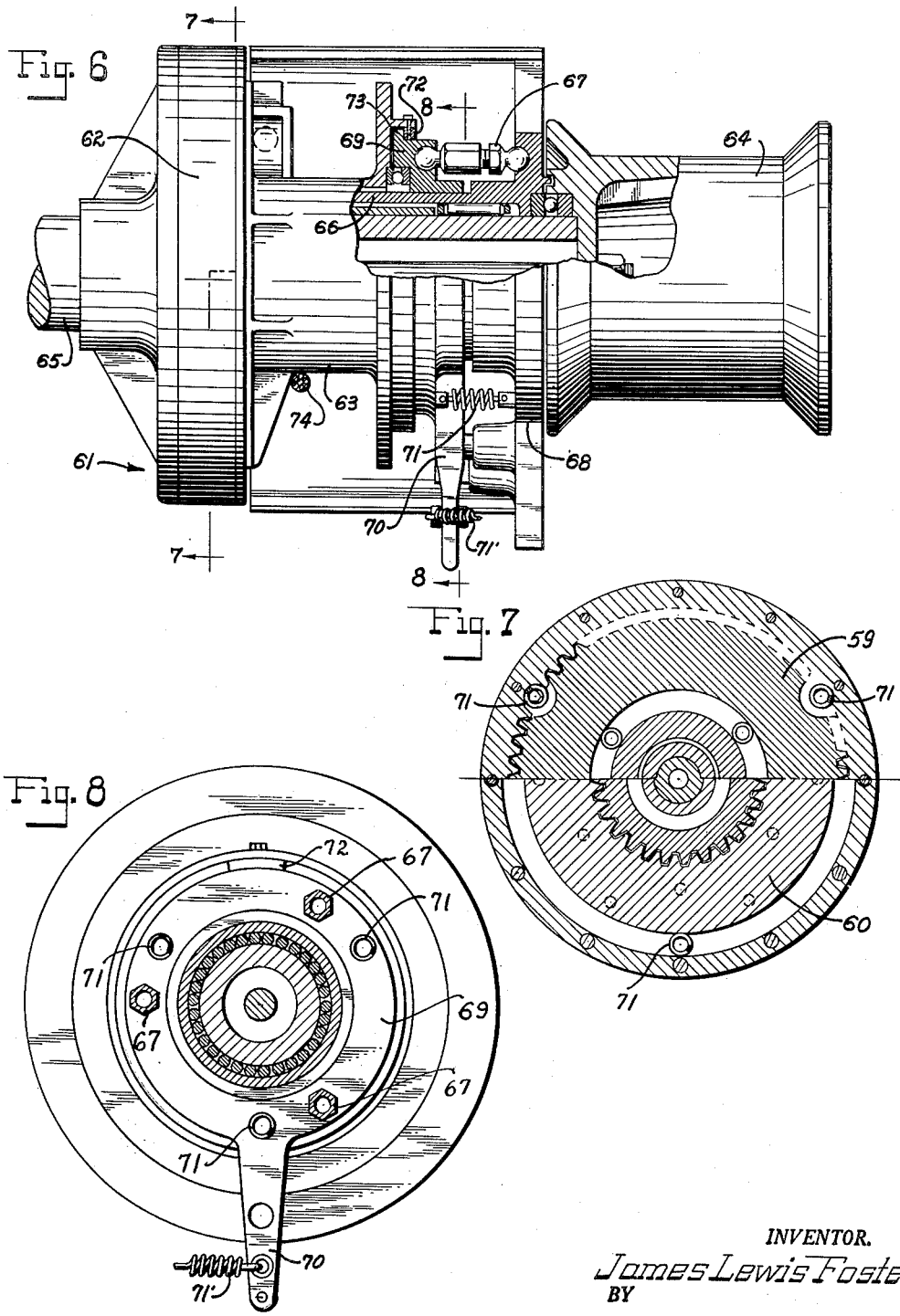

Patented Jan. 5, 1954

2,665,113

UNITED STATES PATENT OFFICE 2,665,113

WINDING DEVICE

James Lewis Foster, Wichita Falls, Tex., assignor to Foster Cathead Company, Wichita Falls, Tex., a firm Application November 19, 1948, Serial No. 60,934

22 Claims. (Cl. 254—187)

This invention relates to improvements in Spooling Devices, and more particularly to multiple disk clutches for spooling mechanisms.

Heretofore, the pulling capacity of spooling devices has been limited because of the inability to provide multiple disk clutches for certain spooling mechanisms. Furthermore, various difficulties have been encountered in getting the clutches to release properly, so that the spooling mechanism would not have a tendency to creep or turn when the clutch was disengaged.

Spooling devices have been employed heretofore, one type of which positioned the spool on a live shaft, and the other in which the spool was positioned on a dead or non-rotatable sleeve surrounding the shaft. Many difficulties have been present in positioning the spooling mechanism on a live shaft, as the rotation of the shaft caused the creeping of the spooling member even though the spooling mechanism was disengaged and mounted on anti-friction bearings. While multiple disk clutches may be utilized in such an arrangement, the friction of the disks, even when disengaged, presented additional friction to cause creeping of the drum.

Heretofore, spooling devices which have operated on a stationary sleeve in which the shaft rotated, did not lend themselves to the use of multiple disks for the clutch, because of the manner of retaining certain of the disks in fixed relation on the drum, while certain other of the disks were connected to the rotatable member.

An object of this invention is to provide a spooling device that will not creep or turn when disengaged, and which utilizes a multiplicity of clutch disks to give greater pulling capacity to the spooling device.

Another object of the invention is to provide a spooling device, the clutch member of which has multiple disks, each of which will disengage from the adjacent member so there will be no friction therebetween.

Still another object of this invention is to provide an air operated clutch in which the air is conveyed to the clutch pressure member through a non-rotating connection.

Another object of this invention is to provide a simple and efficient spooling device that may be attached to a rotatable shaft on a drilling rig or the like to perform a winching operation, and which is sturdy in construction and inexpensive to manufacture.

In the present invention, the use of a stationary sleeve to prevent the normal creeping or turning of the spooling member, while the shaft therein is rotating; and the use of multiple disks, which when engaged, present a greater torsional capacity, are incorporated into the device. When the disks are disengaged, each individual clutch plate is spaced a fixed distance from the adjacent clutch plate.

The present clutch is so designed that it may be operated either by mechanical means, or by fluid pressure means.

An embodiment of this invention, together with a modification thereof, are illustrated in the accompanying drawings, in which:

Fig. 1 is a longitudinal sectional view through one form of the invention, with parts broken away and others shown in elevation;

Fig. 2 is an end view of a cathead attached to the end of a shaft;

Fig. 3 is a cross section on the line 3—3 in Fig. 1, looking in the direction indicated by the arrows;

Fig. 4 is a cross section on the line 4—4 in Fig. 1, looking in the direction indicated by the arrows;

Fig. 6 is a side elevation of a modified form of the invention with parts broken away and in section;

Fig. 7 is a cross section on the line 7—7 in Fig. 6, looking in the direction indicated by the arrows; and Fig. 8 is a cross section on the line 8—8 in Fig. 6.

Figure 5:
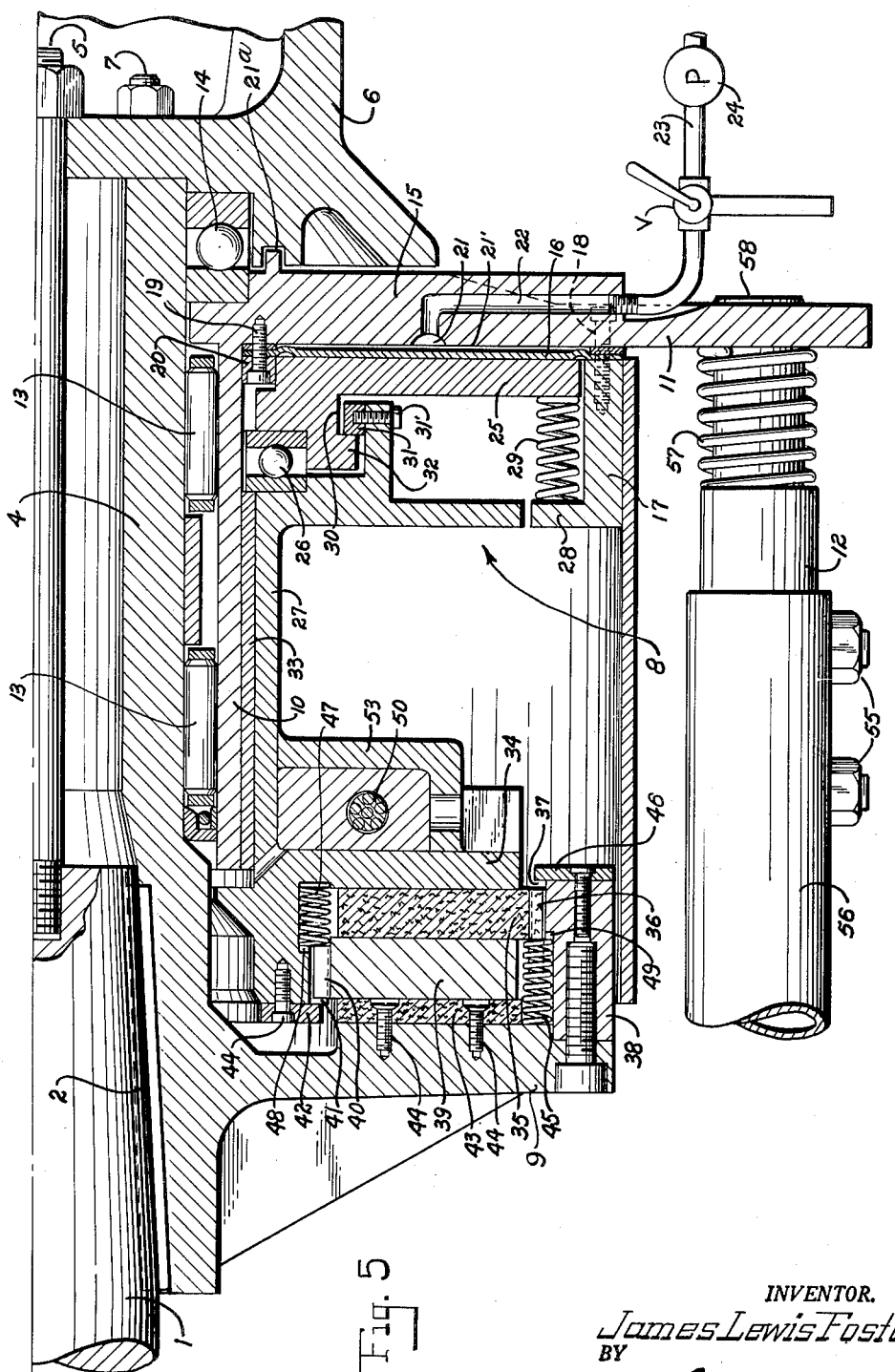
Fig. 5 is an enlarged longitudinal sectional view of the lower portion of the spooling mechanism, with parts broken away and others shown in elevation to illustrate the details of construction.

With more detailed reference to the drawings, the numeral 1 designates a shaft, such as the jack-shaft of a rotary-drilling rig, and which is tapered at 2 to receive a spooling device or cathead assembly, designated generally by the numeral 3. The cathead assembly 3 has a sleeve 4 that has a complementary tapered bore to interfit in driving relation with the tapered portion 2 of the jack-shaft 1. An axial bolt 5 passes through the cathead assembly 3 and secures it in binding engagement with the shaft 1, so as to rotate the sleeve 4 whenever the shaft 1 is rotated.

A cathead spool 6 is secured to the outer end of the shaft 1 by the bolt 5 and to the sleeve 4 by bolts 7, which cathead spool 6 turns whenever the shaft 1 and sleeve 4 turn. The sleeve 4 has a cable spooling member, designated generally by the numeral 8, journaled therearound, intermediate the cathead spool 6 and the outturned flange 9 which is mounted on and made integral with the sleeve 4. The outturned flange 9 serves as a back-up flange for the clutch disk, as will be fully set out hereinafter.

A non-rotatable sleeve 10 surrounds the sleeve 4 and has an outwardly projecting arm 11 secured thereto and to a telescoping anchor member 12, which holds the non-rotatable sleeve against rotation, upon rotation of the shaft 1 and sleeve 4. Bearings 13 surround the sleeve 4 and are positioned so as to form a bearing relation with the inner diameter of the sleeve 10. A thrust bearing 14 is positioned intermediate the non-rotatable sleeve 10 and the inner end of cathead spool 6, so as to minimize the friction when the clutch is applied, as will be described more fully hereinafter.

The non-rotatable sleeve 10 has a circular flange 15 which circular flange serves as a diaphragm retaining member and is of a diameter substantially as the diameter of the entire assembly, as will best be seen in Figs. 1, 4 and 5 around the end thereof which is adjacent the cathead spool 6, to which flange the outwardly projecting arm 11 is connected. A pressure responsive diaphragm 16 which diaphragm is substantially the same size as the circular flange 15, as will be seen in Figs. 1 and 5 is mounted on the inner face of circular flange 15, and is secured around the outer periphery thereof intermediate the flange 15 and an annular ring 17, in fluid tight relation, by means of screw bolts 18 as will best be seen in Figs. 1, 4 and 5. As shown in Figs. 1 and 5, the outside diameter of diaphragm 16 is greater than the outside diameter of either of the friction disk elements 35 and 43, and the inside diameter of the diaphragm is less than the diameter of either of the friction disk elements 35 or 43. The pressure responsive diaphragm 16 is secured to the inner face of the circular flange 15 around the inner diameter thereof by bolts 19 which secure a ring 20 in binding engagement therewith. An outwardly projecting annular ring 21a is formed on the outer face of circular flange 15 and projects outward to interengage with a complementary groove formed in the inner face of cathead spool 6. This forms a seal to prevent entrance of mud and foreign matter into bearing 14.

An annular fluid groove 21 is formed in the inner face of the flange 15, which annular groove connects with and forms part of a fluid-tight chamber 21', intermediate the diaphragm 16 and the non-rotatable circular flange 15. The annular groove 21 has a passage 22 adapted to be connected with a fluid supply line 23, as will best be seen in Fig. 5. The fluid supply line 23 has a three-way control valve V therein for regulating the flow of fluid to and from the pressure chamber 21', and the fluid supply line 23 may be connected with a suitable fluid pressure generating element, such as an air compressor pump 24, as shown in Fig. 5. The pump 24 supplies fluid under pressure to the diaphragm 16.

An annular disk member 25 has the face thereof positioned against the diaphragm 16 and serves as a diaphragm reaction member, and has a thrust bearing 26 interposed intermediate the annular disk 25 and the hub 27 which forms the drum barrel of the cable spooling drum 8. The hub 27 is journaled on the non-rotatable sleeve 10. The ring 17 which binds the outer periphery of diaphragm 16 to the non-rotatable circular flange 15, has an in-turned rim 28 that is adapted to confine compression springs 29 intermediate the in-turned rim 28 and the annular disk 25. The purpose of the springs 29 will be described more fully hereinafter.

An annular groove 30 is formed in the hub of the annular disk 25, and has a segmental ring 31 fitted therein, which segmental ring is secured to the drum hub 27 by bolts 31'. The segmental ring 31 is adapted to engage the out-turned rim 32, on the hub of annular disk 25, and forms one side of the groove 30 therein, so as to hold the drum hub 27 and the annular disk 25 in spaced longitudinal alignment for simultaneous movement, for the engagement and disengagement of the clutch. A sleeve bearing 33 is fitted within drum 8 and is fixed against rotation with respect thereto, and is journaled for axial and rotary movement with respect to stationary sleeve 10.

Upon application of fluid pressure to the diaphragm 16, the annular ring 25 will transmit pressure to thrust bearing 26, and to drum hub 27. The drum 8, which has sleeve bearing 33 therein will move axially along the sleeve 10 to cause a drum flange 34 to move into contact with a friction disk 35. The friction disk 35 which drum flange serves as a pressure plate therefor is interconnected with the outstanding rotatable flange 9 by teeth 36 on the friction disk 35 inter-engaging internal complementary teeth 37 secured on a ring 38 around the outer periphery of the rotatable flange 9.

An annular metallic clutch disk 39 has teeth 40 within the internal diameter thereof, which hub teeth are adapted to engage complementary teeth 41 secured on the drum 27, so that the clutch disk 39 will rotate in unison with the spooling drum 8. The teeth 40—41 allow axial movement of the annular metallic clutch disk 39 with respect to the drum 8 upon engagement and disengagement of the clutch.

A retainer ring 42 is secured to the inner end of the cable spooling drum 8 for inter-engagement with the teeth 40 of the clutch disk 39, so as to limit the axial movement of the drum 8 with respect to the clutch disk 39.

Each side of the clutch disk 39 presents a frictional face for engagement with the adjacent faces of frictional elements 35 and 43, as will best be seen in Fig. 5. The friction element 43 is secured to the out-turned flange 9 by means of bolts 44 and is adapted to rotate therewith.

Springs 45 are mounted between the outer faces of the out-turned flange 9 and the inner face of the friction member 35, and have a normal tendency to urge the friction member 35 outward until the outer face thereof is in contact relation with a retainer ring 46 secured to an annular ring 38. The springs 45 are mounted externally of the clutch disk 39, in spaces 49 which are spaced circumferentially therearound, so as to enable free rotation of the clutch disk 39 when the clutch pressure diaphragm is not engaged. Springs 47 are also mounted internally of the friction member 35, spaced circumferentially therearound, and bear against the drum flange 34 and the annular clutch disk 39, so as normally to space the friction member 35 and the clutch disk 39 from each other, when the pressure diaphragm member 16 is out of pressure bearing relation with the annular disk 25.

While the friction disk 35 and the clutch disk 39 may be spaced as desired, a specific example will be set out, in an effort to define clearly the advantages of the spacing arrangement for maintaining a spaced relation between the friction surfaces when the clutch is engaged. Upon deflation to the diaphragm 16, the springs 29 will move annular disk 25 until the out-turned rim 32 contacts the segmental ring 31, which will, in turn, draw the spooling drum hub 27 axially on the sleeve 10 until the annular ring 42 contacts the inner face of the teeth 40. The movement of the springs 29 against the annular disk diaphragm follower 25 is so gauged that the desired spacing between the clutch disks 39 and 43 will be the proper spacing, usually about $\frac{1}{32}$ of an inch clearance.

Upon axial movement of the drum 8, the springs 45 are permitted to push the friction member 35 outward until the ring 46 restrains the friction member 35 from further movement. The friction disks, thus spaced, have no contact relation with the adjacent friction surfaces. Since no contact relation exists between the clutch members, there is no tendency of the drum to creep or drag while the clutch members are thus engaged.

With the particular arrangement, as set forth, the use of a multiplicity of clutch disks is made possible; in fact, three interengaging frictional surfaces are provided, which increases the frictional contact for heavy duty pulling.

The pressure applying element, as shown in Figs. 1 to 5, inclusive, embodies the diaphragm 16 which is responsive to fluid pressure applied through the passage 22 by pump 24. When the pressure is applied, the diaphragm moves the annular disk 25, spooling drum 8, out-turned flange 34, frictional element 35, and clutch disk 39 axially to engage the friction element 43, compression springs 29, 45, and 47 yielding, to bind the drum 8 into driving relation with the out-turned flange 9, which is secured to the rotatable jack-shaft 1.

Upon binding the above-mentioned elements in driving relation, the cable spooling drum 8 will be rotated to wind a cable 50 around the drum 8 (Fig. 3). The cable 50 is attached to a disk rope socket 51, which rope socket has a tapered hole therein to receive the cable for locking relation therewith. The disk rope socket 51 is mounted within a recess 52 which is formed by ribs 53 positioned on the inside of the spooling drum 8 (Figs. 2 and 3), and are spaced apart to define a slot 54 therebetween to enable the rotary movement of the disk cable socket member 51.

The non-rotating sleeve 10 is anchored against rotation by means of the telescoping anchor member 12. The anchor member 12 is adjustable in length by loosening set screws 55 connected with a mounting member 56 and engaging the anchor member 12. The non-rotating sleeve is secured against rotation by means of the telescoping anchor member 12 and the mounting member 56 for supporting said anchor member.

A spring 57 is mounted intermediate the end of the telescoping anchor member 12 and the arm 11 to hold the circular flange 15 normally outward in contact relation with the thrust bearing 14, to maintain the spaced relation of the clutch disks when the clutch is disengaged. The outer end of the arm 11 has a hole therein to receive a reduced portion 58 of the telescoping anchor member 12. It is convenient to make the anchor member telescoping in view of the various forms of machines to which this present device is to be attached.

The anchor member 12 and the mounting member 56 are so interfitted as to give telescoping adjustment of these members, so the unit may be adjusted readily to the various rigs which have different mounting facilities. The spring 57 is so positioned around the reduced portion 58 of anchor member 12, as to act against a shoulder thereon to move the arm 11 outward so as to maintain the circular flange 15 in tight relation against thrust bearing 14. This maintains spaced relation of the clutch disks when the clutch is disengaged.

*Operation*

In the drilling of wells, it is desirable to have an auxiliary spooling drum that may be used for various line pulling jobs for which it would not be practical to use the hoisting drums that are used to operate the tools, raise and lower casing, and bail out the well being drilled. The apparatus shown with an embodiment of the present invention, usually is known in the trade as a "cathead." The jerk line may be attached to the cathead. With the apparatus mounted on the jack-shaft of a drilling rig, the device is ready for instant use, by the manipulation of the control valve V.

In the form of the invention as shown in Figs. 1 to 5, a three-way valve V is adapted to control the direction of fluid under pressure from the pump 24, through the line 23, and the passage 22 into the annular groove 21 and chamber 21'. The axial thrust on the annular disk 25 by diaphragm 16 will be the resultant of the exposed effective area of the diaphragm times the input pressure exerted by the pump 24. This will move the annular disk 25 axially to compress the springs 29 and exert pressure upon the thrust bearing 26 to cause the thrust bearing 26 to move the drum axially along the non-rotatable sleeve 10; which will cause the flange 34 to compress the springs 47 and 45, to bring the clutch friction disk 35 against the clutch disk 39 and move said clutch disk 39 into contact relation with the face of the friction disk 43 mounted on the rotating flange 9. This binding engagement will cause the drum 8 to rotate in unison with the flange 9, which is secured in driving relation with the shaft 1, and is rotatable therewith.

The multiple disk clutch comprises the flange 34, friction disk 35, clutch disk 39 and flange 9 to which the disk of friction material 43 is attached. In order to release and disengage this clutch, the fluid is released from the chamber 21', by moving the three-way valve V to a position to close off the in-coming fluid and to exhaust the fluid in the chamber 21' outward through the annular groove 21, and the passage 22, to the three-way valve V, which is open to the atmosphere. When the pressure is released, the springs 29 will act against the annular disk 25 to cause the fluid to be expelled from the chamber 21'.

At the same time, through the interconnection of the segmental ring 31 and the out-turned shoulder 32, the drum 8 will be moved axially along the sleeve 10, which will cause the flange 34 to have a tendency to move away from the friction element 35. In so doing, the springs 45 will react to move the friction element 35 away from the clutch disk 39 into contact with the shoulder formed by the ring 46 attached to the rotatable flange 9. The flange 34, however, will continue to travel axially outward until it is a spaced distance from the adjacent face of the friction element 35 at the end of the movement.

The springs 47 which are mounted between the flange 34 and clutch disk 39 act upon the clutch disk 39 to move it a spaced distance inward away from friction element 35, when the latter is then retained by the shoulder 46 spaced from the flange 34. The springs 47 expand against the shoulder 48, which limits the movement of the clutch disk 39 away from the flange 34, and also spaced from the friction member 43. This will provide for a definite spacing between these respective members, which may be, as an example, approximately $\tfrac{1}{32}$ inch.

It will be appreciated readily that the clutch elements, when out of engagement, will be spaced apart, preferably about $\tfrac{1}{32}$ of an inch; therefore, since there is no contact between the elements, there will be no drag, and the drum 8 is completely disengaged, and bearing 33 is resting upon the sleeve 10, and the drum will remain stationary unless rotated by the unwinding of cable 50 therefrom.

Modification

A modified form of the invention is shown in Figs. 6 to 8 inclusive, which utilizes the same type of multiple disk clutch elements, as shown in Figs. 1 to 5. However, this modified form of the invention utilizes a manually operated lever to apply the pressure, instead of fluid pressure as described above.

The spooling device, generally designated by the numeral 61, has multiple disks 59 and 60, to form a clutching arrangement similar to that shown in Figs. 1 to 5, encased within a housing 62. A spooling drum 63 is mounted intermediate a continuous rotatable cathead 64 and jackshaft 65, Fig. 6. The frame member carries a non-rotatable sleeve 66, comparable to the non-rotatable sleeve 10 in the form of the invention hereinbefore described.

This form of the invention has a plurality of adjustable toggle links or "crowder" pins 67 mounted in the sockets between a non-rotatable out-turned flange 68 and sockets in the outer face of annular ring 69, which is adapted to be moved through an arc by means of a lever 70. This movement of the lever 70 will bring the toggle pins 67 which are positioned at an angle with respect to the axis of the drum, more nearly into axial alignment with the drum. This will cause the annular ring 69 to be moved inward, and which in turn, will push the drum 63 axially along the non-rotatable sleeve member 66 to cause binding engagement of the clutch within the mechanism, as hereinbefore described.

Springs 71 are interconnected between the flange 68 of the non-rotatable member 66 and the annular ring 69, so upon release of the lever 70, a spring 71' will rotate the annular ring 69 through an arc, and the springs 71 will draw the drum 63 outward, due to the ring 72 on the drum interengaging an out-turned rim 73 on the annular ring 69.

Operation of the modified form

With the hoisting device 61 mounted on the non-rotatable sleeve 66, and with the sleeve 66 secured against rotation, and with the housing 62 secured to the rotatable shaft 65, the device is ready for operation. Upon moving the lever 70 in an arc about the axis of the shaft 64, the toggle pins 67, which are positioned at an angle with respect to the axis of the drum, between the annular ring 69 and the non-rotatable member 68, in one direction, will tend to become parallel with the axis of the drum 63. This will crowd the annular ring 69 inward, and thereby push the drum 63 into engagement with the multiple clutch disks 59, 60, as shown in Fig. 7, to cause the drum to engage in driving relation with the shaft 65 for spooling the cable 74 around the drum 63.

Upon rotation of the lever 70 in the opposite direction, the toggle pins 67 will be returned to their angular positions, to enable the springs 71, 71' to withdraw the drum from engagement with the clutch disks 59 and 60, so as to permit the rotation of the spooling drum to be arrested, or the free turning thereof will be allowed for unwinding the cable therefrom.

While the invention has been illustrated and described in certain embodiments, it is recognized that variations and changes may be made therein, without departing therefrom, except as specified in the claims.

I claim:

1. In a cable drum device connected to and driven by a rotatable shaft, a sleeve fixed on said shaft for rotation therewith, a non-rotatable sleeve journaled on said first-mentioned sleeve, a drum mounted on said non-rotatable sleeve for rotation therearound and for a limited axial movement thereon, said drum being adapted to have a pull line connected thereto for winding thereon upon rotation of said drum, and fluid actuated means for connecting said drum with said rotatable shaft.

2. In a cable drum device connected to and driven by a rotatable shaft, a sleeve fixed on said shaft for rotation therewith, a non-rotatable sleeve journaled on said first mentioned sleeve, a drum mounted on said non-rotatable sleeve for rotation therearound and for a limited axial movement thereon, said drum being adapted to have a pull line connected thereto for winding thereon upon rotation of said drum, a multiple disk clutch mounted on said drum for driving connection with said rotatable shaft upon axial movement of said drum, and fluid means for engaging the clutch to connect said rotatable shaft with said drum for rotation therewith.

3. In a cable drum device connected to and driven by a rotatable shaft, a sleeve fixed on said shaft for rotation therewith, a non-rotatable sleeve journaled on said first mentioned sleeve, a drum mounted on said non-rotatable sleeve for rotation therearound and for a limited axial movement thereon, said drum being adapted to have a pull line connected thereto for winding thereon upon rotation of said drum, an outstanding flange connected to the first mentioned sleeve and rotatable therewith, a disk mounted for rotation with said flange and axially movable with respect thereto, a second disk connected to said drum and rotatable therewith and mounted intermediate said first mentioned disk and said flange and adapted to be engaged therebetween upon relative axial movement between said drum and said flange, and fluid actuating means for imparting relative axial movement between said drum and said flange.

4. In a cable drum device connected to and driven by a rotatable shaft, a sleeve fixed on said shaft for rotation therewith, a non-rotatable sleeve journaled on said first-mentioned sleeve, a drum mounted on said non-rotatable sleeve for rotation therearound and for a limited axial movement thereon, said drum being adapted to have a pull line connected thereto for winding thereon upon rotation of said drum, an outstanding flange connected to said first-mentioned sleeve and rotatable therewith, a disk mounted for rotation with said flange and axially movable with respect thereto, a second disk connected to said drum and rotatable therewith and mounted intermediate said first-mentioned disk and said flange and adapted to be engaged therebetween upon axial movement of said drum, and fluid pressure actuating means for imparting axial movement to said drum.

5. In a cable drum device connected to and driven by a rotatable shaft, the combination of a rotatable sleeve fixed to the shaft, a non-rotatable sleeve surrounding the rotatable sleeve, a drum journaled on said non-rotatable sleeve, fluid actuated means for causing relative axial movement between the drum and the non-rotatable sleeve, and means forming a plurality of clutch faces between said drum and the rotatable sleeve.

6. In a cable drum device connected to and driven by a rotatable shaft, the combination of a rotatable sleeve fixed to the shaft, a non-rotatable sleeve surrounding the rotatable sleeve, a drum journaled on said non-rotatable sleeve, fluid actuated means for causing relative axial movement between the drum and the non-rotatable sleeve, means forming opposed clutch faces on the drum and the rotatable sleeve, a friction member interposed between said clutch faces in position for clutch engagement upon said axial movement.

7. In a cable drum device connected to and driven by a rotatable shaft, the combination of a rotatable sleeve fixed to the shaft, a non-rotatable sleeve surrounding the rotatable sleeve, a drum journaled on said non-rotatable sleeve, means for causing relative axial movement between the drum and the non-rotatable sleeve, means forming opposed clutch faces on the drum and the rotatable sleeve, and a friction member interposed between said clutch faces in position for clutch engagement upon said axial movement, a disk interposed between said friction member and one of said clutch faces and movable axially relative thereto, and yieldable means interposed between the clutch faces and the respective friction member and disk tending to separate said friction member and disk from the clutch faces and each other upon release of the axial movement means.

8. In a cable drum device connected to and driven by a rotatable shaft, the combination of a rotatable sleeve fixed to the shaft, a non-rotatable sleeve surrounding the rotatable sleeve, a drum journaled on said non-rotatable sleeve, means for causing relative axial movement between the drum and the non-rotatable sleeve, means forming opposed clutch faces on the drum and the rotatable sleeve, a friction member interposed between said clutch faces in position for clutch engagement upon said axial movement, a disk interposed between said friction member and one of said clutch faces and movable axially relative thereto, yieldable means interposed between the clutch faces and the respective friction member and disk tending to separate said friction member and disk from the clutch faces and each other upon release of the axial movement means, and means for limiting the axial movement of the disk and the friction member in opposite directions for limited spacing therebetween.

9. In a cable drum device, the combination with a rotatable shaft, of a rotatable sleeve supported by the shaft and fixed thereto, a non-rotatable sleeve surrounding the rotatable sleeve and having means fixing said sleeve against rotation, a drum journaled on said non-rotatable sleeve, means for causing relative axial movement between the drum and the non-rotatable sleeve, means forming opposed clutch faces on the drum and the rotatable sleeve, and a friction member interposed between said clutch faces in position for clutch engagement upon said axial movement, a disk interposed between said friction member and one of said clutch faces and movable axially relative thereto, and yieldable means interposed between the clutch faces and the respective friction member and disk tending to separate said friction member and disk from the clutch faces and each other upon release of the axial movement means.

10. A cable drum device connected to and driven by a rotatable shaft, a sleeve fixed on said shaft for rotation therewith, a non-rotatable sleeve journaled on said first-mentioned sleeve, a drum mounted on said non-rotatable sleeve for rotation therearound, said drum being adapted to have a pull line connected thereto for winding thereupon upon rotation of said drum, and fluid actuated diaphragm means for connecting said drum with said rotatable shaft.

11. In a cable drum device, the combination with a rotatable shaft of a rotatable sleeve supported by the shaft and fixed thereto, a non-rotatable sleeve surrounding the rotatable sleeve and having means fixing said sleeve against rotation, a drum journaled on said non-rotatable sleeve, means forming opposed clutch faces on the drum and the rotatable sleeve, a friction member interposed between said clutch faces, a disk interposed between said friction member and one of said clutch faces, yieldable means interposed between the clutch faces and the respective frictional member and disk tending to separate said member and said disk from the clutch faces and from each other, and means operable to engage said clutch faces and said disk and said friction member.

12. In a cable drum device connected to and driven by a rotatable shaft, a sleeve fixed on said shaft and rotatable therewith, a non-rotatable sleeve journaled on said first mentioned sleeve, a drum journaled on said non-rotatable sleeve for rotation therearound and for longitudinal movement thereon, an out-turned flange connected to said rotatable sleeve and rotatable therewith, a friction disk connected with said out-turned flange and rotatable therewith and axially movable with respect thereto, a clutch disk connected to said drum and rotatable therewith and axially movable with respect thereto, said clutch disk being mounted intermediate said friction disk and said out-turned flange, a drum flange forming a part of said drum which is rotatable therewith and positioned for selective engagement with said friction disk to rotate therewith upon longitudinal engagement of said friction disk and said drum flange, fluid actuated means for imparting longitudinal movement to said drum with respect to said non-rotatable sleeve to cause interengagement of said drum flange and said friction disk to cause unitary rotation of said drum and said rotatable shaft.

13. In a cable drum device connected to and driven by a rotatable shaft, a sleeve fixed on said shaft and rotatable therewith, a non-rotatable sleeve journaled on said rotatable sleeve, a drum journaled on said non-rotatable sleeve for rotation therearound and for a limited axial movement thereon, said drum being adapted to have a pull line connected thereto for winding said pull line therearound upon rotation of said drum, an out-turned flange connected to said rotatable sleeve and rotatable therewith, a friction disk connected with said out-turned flange and rotatable therewith and axially movable with respect thereto, a clutch disk connected to said drum and rotatable therewith and axially movable with respect thereto, said clutch disk being mounted intermediate said friction disk and said out-turned flange, a drum flange forming a part of said drum which is rotatable therewith and positioned for selective engagement with said friction disk to rotate therewith upon longitudinal engagement of said friction disk and said drum, and fluid actuated means for applying longitudinal force to said drum to bring said drum flange and said outturned flange into frictional contact with said clutch disk and said friction disk for rotating said drum with said rotatable shaft.

14. In a cable drum device connected to and driven by a rotatable shaft, a sleeve fixed on said shaft and rotatable therewith, a non-rotatable sleeve journaled on said rotatable sleeve, a drum having flanges thereon journaled on said non-rotatable sleeve for rotation therearound and for a limited axial movement thereon, said drum being adapted to have a pull line connected therewith for winding said pull line thereon upon rotation of said drum, an out-turned flange connected to said rotatable sleeve and rotatable therewith, a friction disk connected with said outturned flange and rotatable therewith and axially movable with respect thereto, a clutch disk connected to said drum and rotatable therewith and axially movable with respect thereto, said clutch disk being mounted intermediate said friction disk and said out-turned flange, and fluid actuated means for applying axial force to said drum to bring said out-turned flange and one of said drum flanges into frictional contact with said clutch disk and said friction disk for rotating said drum with said shaft, and spring means interposed between said disks and said flanges for separating said disks and said flanges upon release of said axial force being applied to said drum.

15. In a cable drum device connected to and driven by a rotatable shaft, a sleeve fixed on said shaft and rotatable therewith, a non-rotatable sleeve journaled on said rotatable sleeve, a drum having flanges thereon journaled on said non-rotatable sleeve for rotation therearound and for limited axial movement thereon, said drum being adapted to have a pull line connected thereto for winding said pull line thereon upon rotation of said drum, a flange having an out-turned rim which flange is connected to said rotatable sleeve and rotatable therewith, a friction disk connected with said out-turned rim of said flange adjacent the outer extremity thereof and rotatable therewith and axially movable with respect thereto, a clutch disk interposed between said friction disk and said flange having an outturned rim, which clutch disk is connected to said drum and rotatable therewith and axially movable with respect thereto, and pneumatic pressure actuated means for imparting longitudinal movement to said drum with respect to said non-rotatable sleeve to bring said drum flange and said disks into frictional contact with said flange having an out-turned rim for rotating said drum with said shaft.

16. In a cable drum device connected to and driven by a rotatable shaft, a sleeve fixed on said shaft and rotatable therewith, a non-rotatable sleeve journaled on said rotatable sleeve, a drum journaled on said non-rotatable sleeve for rotation therearound and for axial movement thereon, an out-turned flange connected to said rotatable sleeve and rotatable therewith, a friction disk connected with said out-turned flange and rotatable therewith and axially movable with respect thereto, a clutch disk connected to said drum and rotatable therewith and axially movable with respect thereto, said clutch disk being mounted intermediate said friction disk and said out-turned flange, a drum flange forming a part of said drum which is rotatable therewith and positioned for selective engagement with said friction disk to rotate therewith upon longitudinal engagement of said friction disk and said drum flange, fluid pressure responsive means secured to a flange on said non-rotatable sleeve in position to apply axial force to said drum with respect to said non-rotatable sleeve to cause interengagement of said drum flange and said friction disk to cause unitary rotation of said drum and said rotatable shaft.

17. In a cable drum device connected to and driven by a rotatable shaft and rotatable therewith, a sleeve fixed to said shaft and rotatable therewith, a non-rotatable sleeve having a flange thereon, which sleeve is journaled on said rotatable sleeve, a drum journaled on said non-rotatable sleeve for rotation therearound and for a limited axial movement thereon, said drum having means for connecting a pull line thereto for winding therearound upon rotation of said drum, an out-turned flange connected to said rotatable sleeve and rotatable therewith, a friction disk connected to said rotatable, out-turned flange and rotatable therewith and axially movable with respect thereto, a clutch disk connected to said drum and rotatable therewith and axially movable with respect thereto, said clutch disk connected to said drum and rotatable therewith and axially movable with respect thereto, said clutch disk being mounted intermediate said friction disk and the flange of said out-turned flange, an annular ring mounted for arcuate movement about said non-rotatable sleeve and spaced axially from said flange on said non-rotatable sleeve, a manually actuated lever mounted on said annular ring for imparting arcuate movement thereto, a plurality of toggle pins angularly disposed intermediate said flange positioned on said non-rotatable sleeve and said annular ring in the axial space therebetween, one end of each of said toggle pins being pivotally mounted on said flange on said non-rotatable sleeve and the other end of said of each of said toggle pins being pivotally mounted on said annular ring so the angle of each toggle pin is an acute angle with respect to the point on which it is mounted so upon movement of said annular ring said toggle pins will approach axial alignment with the axis of said drum so as to move said drum axially to cause said drum flange, said friction disk, said clutch disk and said flange of said out-turned member to bindingly engage to cause rotation of said drum upon rotation of said rotatable shaft.

18. In a clutch device, a rotatable shaft having a flange mounted thereon, bearings mounted on said shaft, an out-turned, toothed rim mounted on said flange, a toothed friction disk interconnected with said out-turned, toothed rim and rotatable therewith and axially movable with respect thereto, a non-rotatable member fixed at its outer end against rotation and mounted on said bearings on said shaft for supporting an axially movable flange member that is positioned on one side of said friction disk and carrying a toothed hub, a toothed clutch disk interconnecting said toothed hub and positioned on the opposite side of said friction disk from said axially movable flange, and means for applying pressure to said axially movable flange to cause interengagement with said friction disk, said clutch disk and said flange mounted on said rotatable shaft so as to cause rotation of said axially movable flange.

19. In a clutch device, a rotatable shaft having a flange mounted thereon, bearings mounted on said shaft, an out-turned, toothed rim mounted on said flange, a toothed friction disk interconnected with said out-turned, toothed rim and rotatable therewith and axially movable with respect thereto, a non-rotatable member fixed at its outer end against rotation and mounted on said bearings on said shaft for supporting an axially movable flange member that is positioned on one side of said friction disk and carrying a toothed hub, a toothed clutch disk interengaging said toothed hub and positioned on the opposite side of said friction disk from said axially movable flange, and fluid pressure actuated means for applying pressure to said axially movable flange to cause interengagement with said friction disk, said clutch disk, and said flange mounted on said rotatable shaft so as to cause rotation of said axially movable flange.

20. In a clutch device, a rotatable shaft having a flange mounted thereon, bearings mounted on said shaft, an out-turned, toothed rim mounted on said flange, a toothed friction disk interconnected with said out-turned toothed rim and rotatable therewith and axially movable with respect thereto, fixed at its outer end against rotation and mounted on said bearings on said shaft, a non-rotatable member positioned for supporting an axially movable flange member that is positioned on one side of said friction disk and carrying a toothed hub, a toothed clutch plate interengaging said toothed hub and positioned on the opposite side of said friction disk from said axially movable flange, means for applying pressure to said axially movable flange to cause interengagement with said friction disk, said clutch disk, and said flange mounted on said rotatable shaft so as to cause rotation of said axially movable flange, and yieldable means interposed between said flange carrying said out-turned, toothed rim and said friction disk and between said axially movable flange and said clutch disk so as to separate the adjacent faces of the respective members upon the release of said axially movable flange.

21. A cable winding device comprising a drum, a back-up flange, a diaphragm retaining member, a diaphragm reaction plate, a pressure plate, said drum being interposed between said diaphragm reaction plate and said back-up flange, at least one annular friction disk element disposed between said pressure plate and said back-up flange, non-rotatable means supporting said pressure plate for axial movement relative to said back-up flange, means normally urging said pressure plate and said back-up flange apart, said diaphragm retaining member being restrained against axial movement with respect to said back-up flange, a diaphragm disposed between said diaphragm retaining member and said diaphragm reaction plate, said diaphragm being sealed around the periphery thereof with respect to said diaphragm retaining member, said diaphragm reaction plate being interconnected with said pressure plate through said drum so as to transmit pressure exerted on said diaphragm to said pressure plate and to said annular friction disk so as to frictionally engage said pressure plate in driving relation with said back-up flange, said diaphragm having an effective pressure surface area equal to at least the area of a side of said annular friction disk, and means for introducing fluid under pressure between said diaphragm and said diaphragm retaining member to cause the movement of said pressure plate toward said back-up flange.

22. A cable winding device comprising a back-up flange, a diaphragm retaining member, a winding drum mounted between said back-up flange and said diaphragm retaining plate, a pressure plate mounted on one end of said drum, at least one annular friction element mounted between said back-up flange and said pressure plate, non-rotatable means supporting said pressure plate for axial movement relative to said back-up flange, resilient means normally urging said back-up flange and said pressure plate apart, said diaphragm retaining member being constrained against axial movement with respect to said back-up flange, a diaphragm disposed inwardly of said diaphragm retaining member, a diaphragm reaction plate disposed between said diaphragm and said pressure plate, and means for introducing fluid under pressure between said diaphragm and said diaphragm retaining member to cause movement of said diaphragm reaction plate, said drum, and said pressure plate to bindingly engage said annular friction elements between said pressure plate and said back-up flange.

JAMES LEWIS FOSTER.

References Cited in the file of this patent

UNITED STATES PATENTS

| Number | Name | Date |
| --- | --- | --- |
| 2,328,133 | Foster | Aug. 31, 1943 |
| 2,462,944 | Cardwell et al. | Mar. 1, 1949 |